June 20, 1950 P. HAAS 2,511,914
METHOD OF AND APPARATUS FOR FABRICATING
A CONCENTRIC SEAL ASSEMBLY
Filed July 7, 1945 4 Sheets-Sheet 1
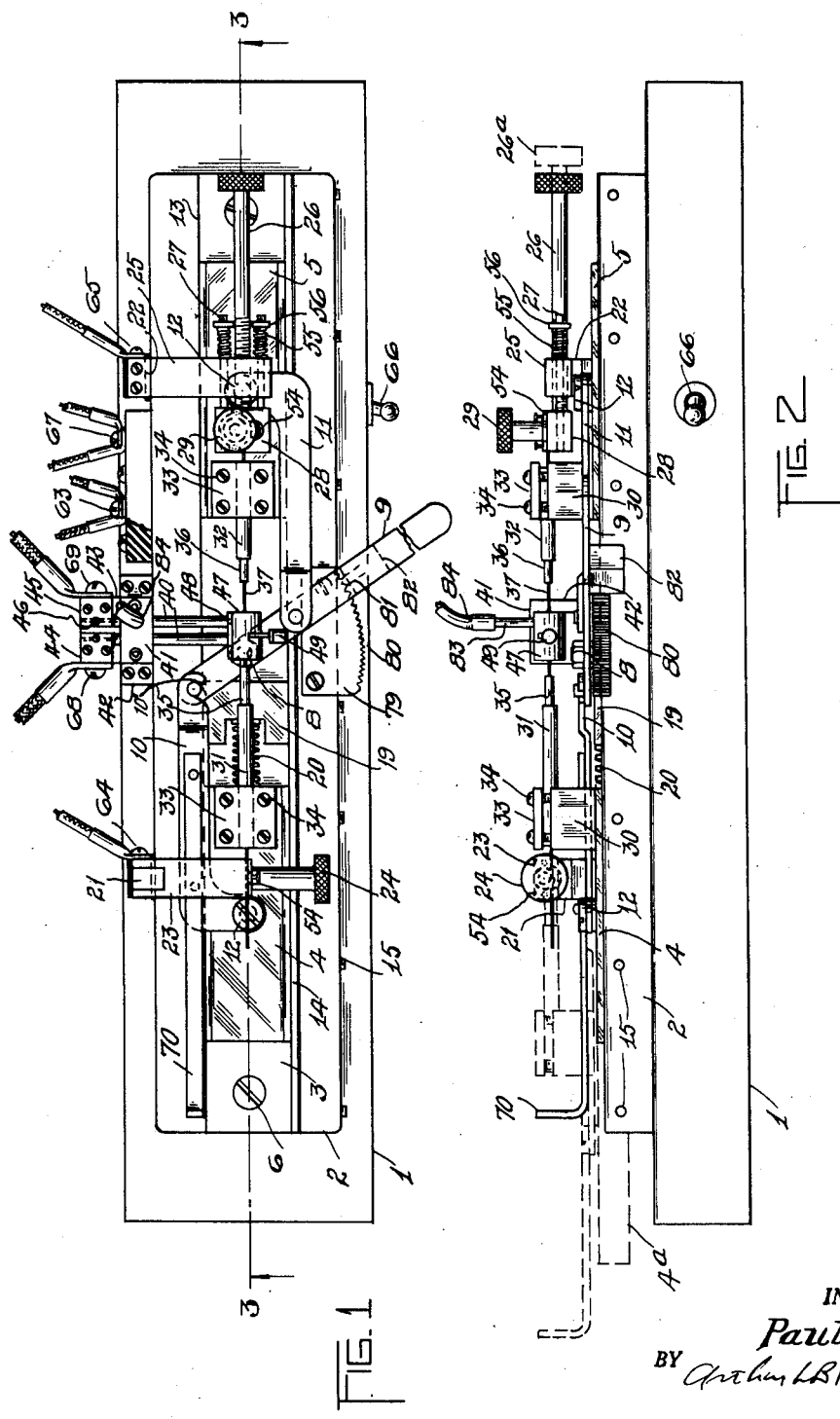
INVENTOR.
Paul Haas
BY Arthur L B Richardson
Attorney

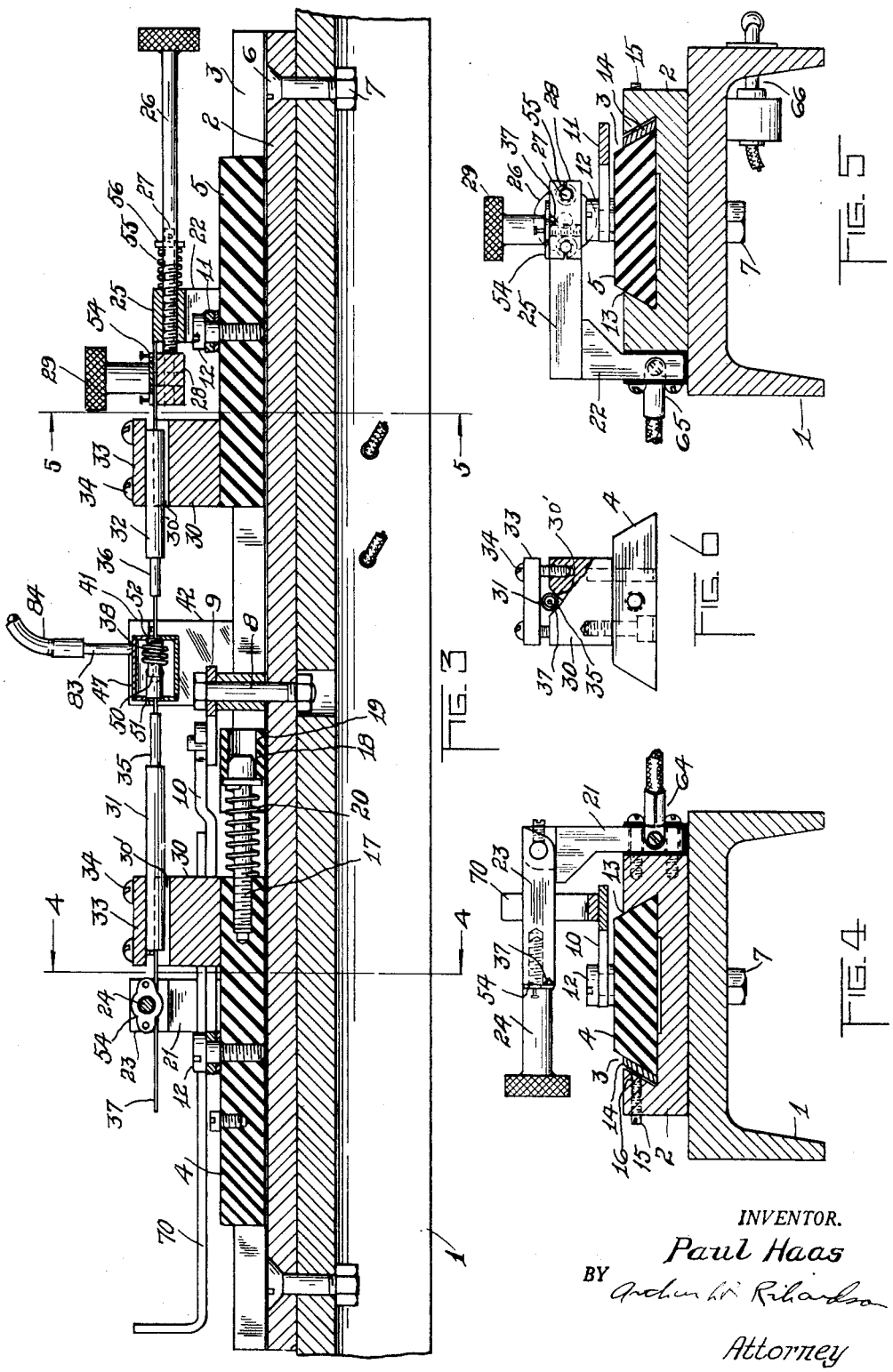

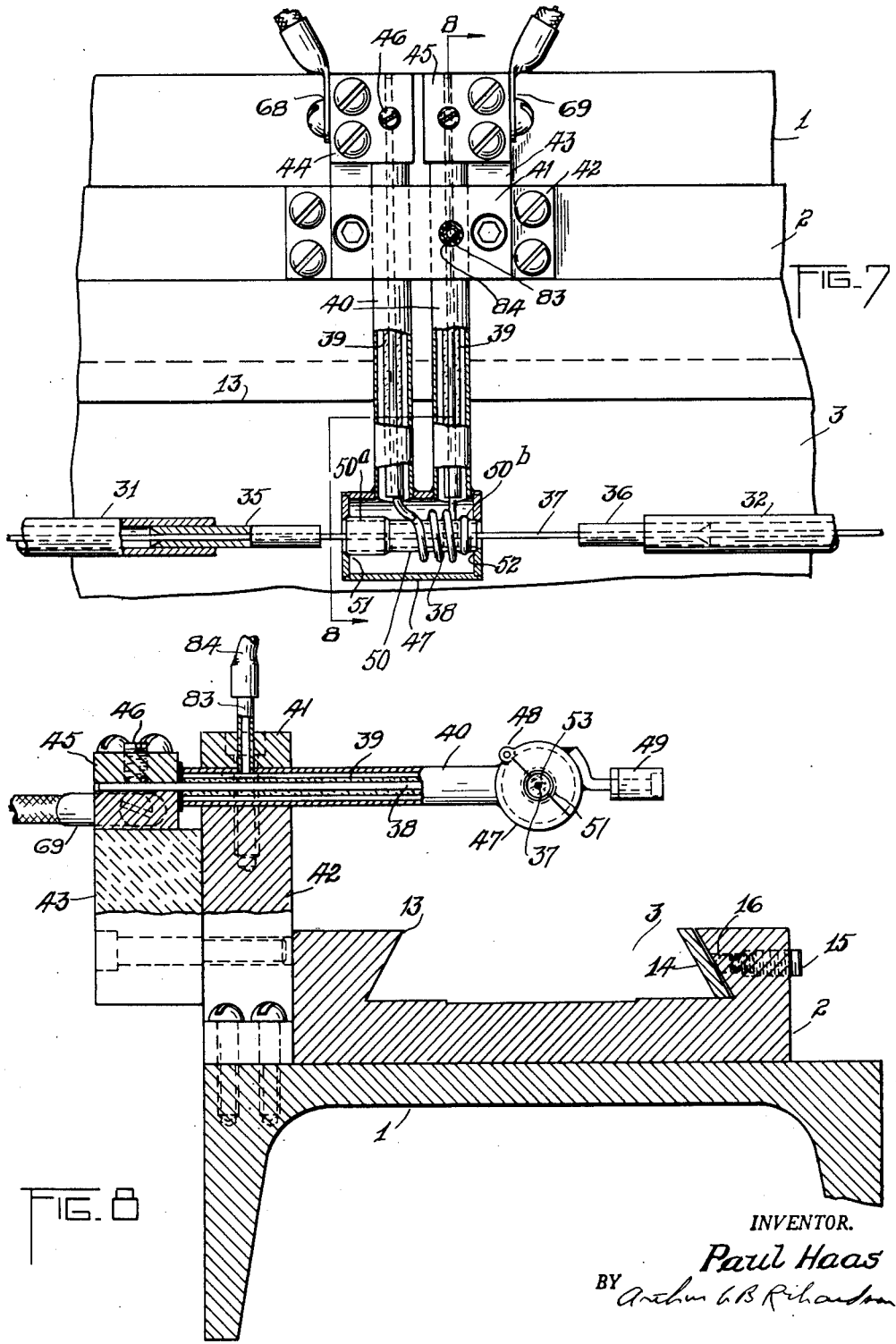

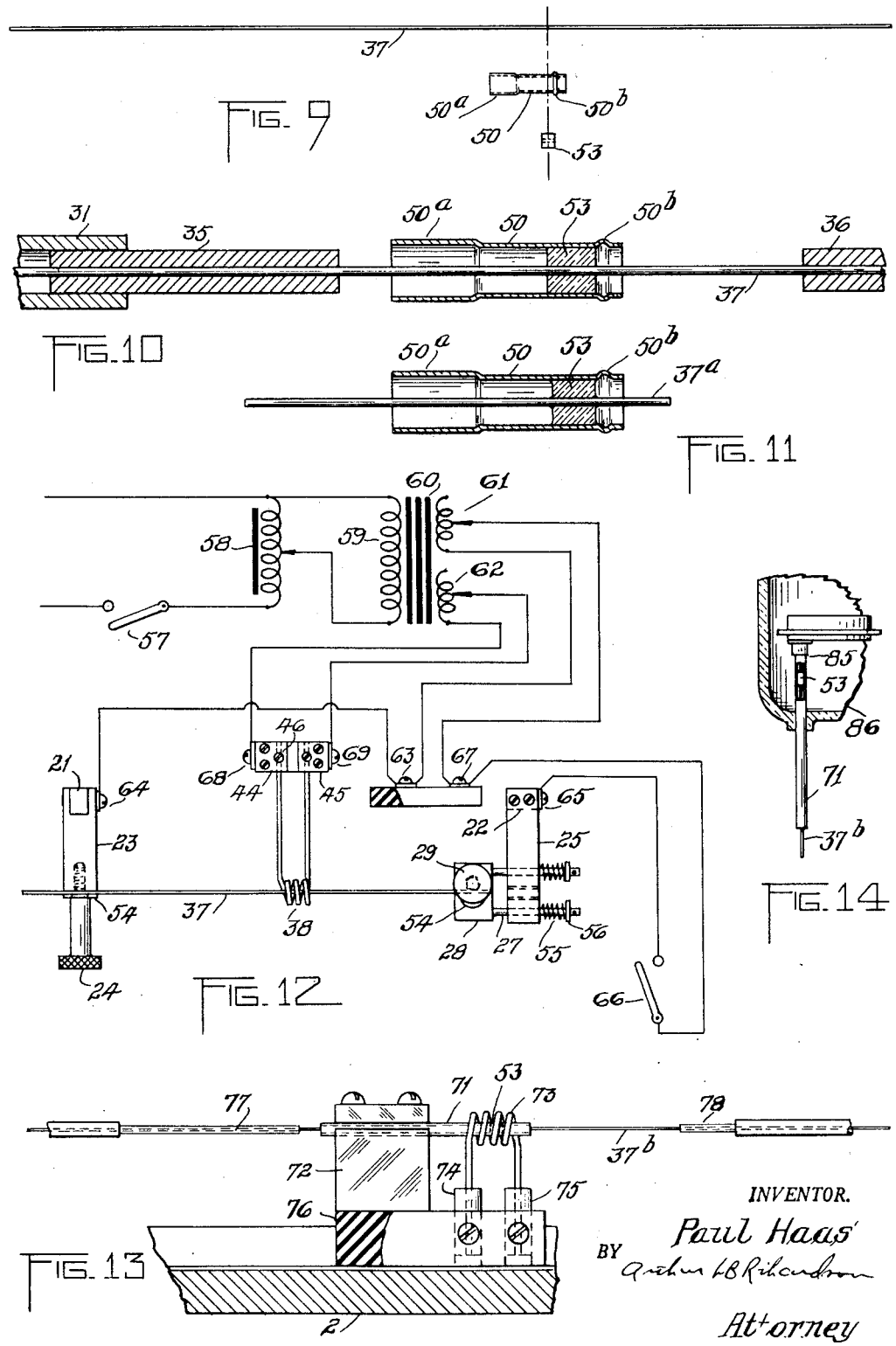

Patented June 20, 1950

2,511,914

UNITED STATES PATENT OFFICE 2,511,914

METHOD OF AND APPARATUS FOR FABRICATING A CONCENTRIC SEAL ASSEMBLY

Paul Haas, Emporium, Pa., assignor to Sylvania Electric Products, Inc., a corporation of Massachusetts Application July 7, 1945, Serial No. 603,679

12 Claims. (Cl. 49—1)

The present invention relates to a method of, and an apparatus for, forming a vacuum tight seal by fusing a glass bead or bushing between a metal sleeve and a line wire mounted coaxially with respect to the sleeve.

It has been customary in forming lead-in conductors for electron discharge devices and for various types of electrical apparatus to seal the lead-in conductor to a glass header or to a glass bushing. This is usually accomplished by providing a glass member or bead with an opening and passing the conductor through the opening, and then heating the assembly externally, such as by a flame, until the glass is softened and until the seal is made. In the manufacture of a concentric seal assembly of the type which will be described hereinafter, I have found that the conventional method of merely heating the assembly externally, such as with a flame, does not produce a seal which is in the most favorable condition to withstand subsequent operations which may be performed on it.

It is, therefore, an object of my invention to provide an improved means of producing a concentric glass-to-metal seal assembly.

A further object of my invention is to provide an improved method of producing a glass-to-metal seal assembly so that the seal will be under a pre-determined stress condition.

A still further object of my invention is to provide an apparatus for the purpose set forth which is of simple construction and operation, not liable to derangement, and by means of which the work may be accomplished with uniform accuracy and as rapidly as permitted by the time intervals necessarily involved in the successive steps of the operation.

Further objects of my invention will become apparent from the following description referring to the accompanying drawing, and the features of novelty which characterize my invention will be pointed out with particularity in the claims annexed to and forming a part of this specification.

In the drawings, Fig. 1 is a top plan view of the apparatus. Fig. 2 is a view in front elevation. Fig. 3 is an enlarged longitudinal sectional view taken on line 3—3 of Fig. 1. Figs. 4 and 5 are transverse sectional views as on lines 4—4 and 5—5, respectively, of Fig. 3. Fig. 6 is an end view of one of the slides. Fig. 7 is a top plan view drawn to a still larger scale of the heating coil and parts associated therewith. Fig. 8 is a sectional view on line 8—8 of Fig. 7. Fig. 9 is a view showing in detail and to actual size the three work pieces, viz., the line wire to be mounted, the sleeve and the bead, these parts being arranged in the relative longitudinal positions they assume when assembled.

Fig. 10 is a greatly enlarged longitudinal sectional view through the assembled parts of the work before sealing, the molds also being shown but in inoperative position. Fig. 11 is a view similar to Fig. 10 of the work after sealing and with the line wire cut to a pre-determined length. Fig. 12 is an electrical diagram of the circuits through the heating elements. Fig. 13 is a fragmentary view partly in vertical longitudinal section and partly in front elevation, illustrating a modification of the invention. And, Fig. 14 is a fragmentary view showing my improved concentric seal assembly and transmission line as employed in an electronic tube.

In the illustrated embodiments of my invention, I have shown a concentric seal assembly for a concentric line construction which, although it may be used in any suitable device, has particular application as a conductor for use with an electron discharge device. I have also described an improved method for forming the glass-to-metal seal, as well as an improved mechanism for carrying out my improved process.

My improved glass-to-metal seal construction for concentric conductors includes an outer metallic sleeve with a coaxial conductor within the sleeve and a glass bead positioned intermediate the ends of the sleeve and sealed, both to the inner surface of the sleeve and the outer surface of the concentric conductor.

Furthermore, after the concentric conductor is fabricated, the outer conductor may then be attached in any suitable manner, such as by brazing to another conductor, and in order to provide a vacuum-tight seal which will maintain its desirable characteristics after the concentric line is attached to a conductor, which as is illustrated in the drawing is a part of an electron discharge device, an improved seal construction is provided in which the glass is in a state of compression, at least in a major portion thereof, subsequent to the sealing of the glass bead to the concentric conductor.

Described hereinafter is my improved method for carrying out and producing this improved seal construction.

In order to provide an improved concentric seal assembly which is substantially vacuum-tight and which includes a glass bead sealed intermediate the ends of a metallic sleeve, I heat the seal assembly from both the inside and outside according to my improved method and through my improved machine which will be described below.

Referring first to Figs. 1 to 12, inclusive.

The base, in this instance, is an inverted channel iron 1 upon which is mounted a guide plate 2 having a longitudinally extending channel 3, the side walls of which are undercut to slidably receive and hold against upward displacement a pair of opposing carriage blocks comprising slides 4 and 5 formed of an electrical insulating material such as Bakelite. Flat-head screws 6, having nuts 7, are employed as means for securing the guide plate to the base.

Pivoted on a fixed stud 8 midway between the slides is a manually operable lever 9 which at diametrically opposite points equidistant from the center of the stud has pivotal connection with the inner ends of a pair of parallel but opposing links 10 and 11, these links being turned laterally at their outer ends and pivotally connected by shouldered screws 12 to the slides 4 and 5, respectively. It will thus be seen that a throw of the lever 9 in one direction or the other will effect a corresponding movement of the slides toward or from each other. The upper wall 13 of the channel 3, Fig. 1, constitutes a base line from which the axial center of the work holding means and coaxial operating members is established. And, interposed between the opposite or lower wall of the channel 3 and the slides is a gib 14 formed in sections and yieldingly held against the slides by set screws 15 through the medium of spring pressed balls 16 acting against the gib, as illustrated in Figs. 4 and 8. A centering pin 17 extends forward from the slide 4, its head locating in a recess 18 in a fixed block 19, and a spring 20 encircling this pin provides a cushion acting against the slides when the latter are moved toward each other as and for the purpose to be described.

Spaced longitudinally, one each side of the stud 8, and upstanding from the rear side of guide plate 2, are arms 21 and 22 insulated from guide plate 2 in any suitable manner. Pivoted to the arm 21 to swing in a vertical plane is a clamp 23 into the free end of which is threaded clamping screw 24. And, rigidly secured to the arm 22 is a horizontally arranged transverse bar 25 through which, adjacent its free end, is threaded longitudinally of the guide 2 an adjusting screw 26. Slidable in the bar 25, on each side of the screw 26, are rods 27 upon the inner ends of which is carried a clamping plate 28 into which is threaded a vertically extending clamping screw 29.

Mounted upon the slides 4 and 5 at their inner ends are blocks 30 having V-grooves 30' which centralize and hold in axial alignment two opposing tubular members indicated by the numeral 31 for the slide 4 and 32 for the slide 5. These tubes are clamped to their respective block members by cover plates 33 held down by screws 34 and comprise the supporting means for punch molds or press members 35 and 36, respectively, each of which latter is a metallic rod pressed or brazed into the projecting inner end of its supporting member and having an aperture extending axially therethrough for slidably receiving the wire 37 to be mounted.

Between the two molds and in axial alignment therewith is a heating element comprising a resistance coil 38, the elongated rearwardly extending ends of which are insulated, as by ceramic sleeves 39, and pass through a pair of transversely arranged tubular arms 40. The latter, adjacent their rear ends, are clamped by a cover plate 41 to a bracket 42 adapted to receive them and upstanding from and secured to the base 1. Fastened to the rear face of this bracket is a block 43 of insulating material carrying split terminal clamps 44 and 45 for the ends of the resistance coil 38, set screws 46 threaded through the clamp covers against the coil wire assuring proper electrical contact of the parts.

The coil 38 is housed within a box or oven 47 comprising a cylindrical member split lengthwise to form two sections which are hinged together at 48, as shown in Fig. 8, the body or under portion being supported on the forward ends of the tubular arms 38 while the top portion or cover is provided with a finger piece 49 for lifting it.

A tubing, in this instance a cathode sleeve, indicated by the numeral 50, has a concentric bulge 50$^a$ at one end for part of its length and adjacent its other end is formed with an annular bead 50$^b$. The end walls of the oven have axially aligned apertures and are counterbored from the inner sides to provide seats 51 and 52 at the left and right, respectively, Fig. 7, for supporting and centering the sleeve 50 and to form shoulders whereby the sleeve is held against axial displacement. The sleeve 50 is placed in the oven 47, as clearly shown in Fig. 7, the heating coil 38 encircling that portion of the sleeve within which the bead 53 is to be located.

Loading the apparatus is as follows:

With a sleeve 50 placed in the oven, as and in the manner just above described, line wire 37 is then threaded into the machine, such as from the left, see Figs. 1, 2, 3, and 7, through the tube 31, its punch rod or mold 35 and the cathode sleeve 50 to a point beyond the oven. A bead 53 of a suitable ceramic such as glass, preferably by the use of tweezers, is slipped on the right hand end of the wire 37, which latter is then extended through the mold 36, tube 32, and over the clamping plate 28, this plate having been moved to a pre-determined position of longitudinal adjustment by means of the screw 26. It may here be stated that the end face of the hinged clamp 23 and top face of the clamping plate 28 are formed with aligned V-grooves for receiving the wire 37 and that under the shouldered clamping screws 24 and 29 are spring washers 54, which, when such screws are tightened to clamp the wire, assure proper electrical connection between the wire and the members to which it is clamped. The adjusting screw 26 is then turned back, as indicated at 26$^a$, Fig. 2, out of engagement with the plate 28 whereupon the wire 37 is placed under tension due to action of coiled compression springs 55 encircling the outer ends of the rods 27 and interposed between the bar 25 and pin-retained washers 56.

With reference to the electrical diagram shown in Fig. 11:

Line wires in which a switch 57 is located lead through an adjustable auto transformer 58, which is connected to the primary winding 59 of a transformer 60 having two secondary windings 61 and 62. A circuit is established from winding 61 through terminal 63, thence to terminal 64, arm 21, clamp 23, line wire 37, clamp 28, rods 27, bar 25, arm 22, terminal 65, switch 66, terminal 67 and thence back to winding 61. A second circuit is established from winding 62 to terminal 68, clamp 44, resistance coil 38, clamp 45, terminal 69 and thence back to winding 62. In the two circuits thus established one is through the coil 38 to provide external heat, and the other, independently controlled, is through the line wire or inner conductor 37 which becomes an internal heater. These secondary windings 61 and 62 may be tapped at any point to provide for a variable control of heat, with respect to each other, of the outer and inner heating elements.

In Fig. 13 there is shown a modification of the invention in which a tubing 71, shown as longer and of less diameter than the illustrated cathode sleeve 50, and of one diameter throughout its length, is clamped in a V-block 72 and extended through a resistance coil 73 supported in substantially the manner shown, that is, with the ends of the coil clamped to terminals 74 and 75 in a fixed base member 76 of insulating material which also supports the block 72. The molds 77 and 78 are supported and operated in the same manner as the like parts 35 and 36 already described.

It will be observed that the link 10, again referring to Figs. 1 to 12, inclusive, has an open ended slot 10' to permit its disconnection from the lever 9. This allows an independent movement of the carriage 4 to the left, as indicated in the dotted lines at 4ª, Fig. 2, so that the work may be removed, when the seal has been made, and the line wire cut to the desired length shown at 37ª in Fig. 11. To facilitate such movement of the carriage 4, a finger actuated pull-bar 70 is secured to the link 10.

For the purpose of holding the lever 9 at any desired position of angular throw, any suitable quickly releasable locking means may be employed. Such means, as illustrated in Figs. 1 and 2 of the drawings, in this instance, includes a plate 79 secured to the carriage guide 2 and having a serrated arcuate edge surface 80, the teeth of which are yieldingly engaged by a spring pressed plunger 81, of known type and operation, slidable in a housing 82 carried on the underside of the lever.

To the end that all heat possible may be conducted through the medium of the tubing 50 to the pressing molds 35 and 36 and, likewise, through tubing 71 to the molds 77 and 78, close sliding fits are provided between the molds and the interior of tube 50. However, expansion of the metal of which molds are made in pre-heating the molds must not be such as to cause a binding action when the molds are retracted, this being another element involved in the timing and heat control hereinabove referred to as included in one of the objects of the invention.

The oven 47 functions not only as the means for supporting the tubular member 50 of the work but, as hereinabove stated, provides a chamber for retaining and, by reflection, intensifying heat from the coil 38, and also becomes an enclosure for a non-oxidizing gas which allows heating the coil to a greater degree. The non-oxidizing gas is provided by a trickle of nitrogen supplied through a flexible hose 84 coupled to a short pipe 83 upstanding from the bracket cover 41 and communicating with one of the tubular supporting arms 40 through which the gas is conducted to the heating chamber.

While it will, of course, be understood that the amount and duration of heat applied to the work, as well as the timing of the successive operations, will vary according to the relative dimensions of the work pieces forming the assembly, the successive steps in the operation will be the same and are, referring to Figs. 1 to 12, substantially as follows:

A valve, not shown, in the conduit 84 is opened to permit a trickle of nitrogen to flow into the oven. Then, with the sleeve 50, line wire 37 and bead 53 assembled as already described, lever 9 is thrown to the left, with reference to Fig. 1, causing the molds 35 and 36 to move toward each other and into the opposite ends of the sleeve 50 against action of spring 20 to slide the bead along wire 37 to a predetermined position intermediate the ends of the sleeve and then withdrawn. The wire 37, it will, of course, be understood, is clamped to the members 23 and 28 and placed under tension of the springs 55. The springs are effective upon disengagement of adjusting screw 26 from the plate 28.

Switch 57 is then closed, the auto transformer 58 regulated for the desired number of amperes to flow through heating coil 38 and the inner conductor switch 66 is closed. The molds 35 and 36 now in retracted position are again slid into the sleeve 50 to pre-heat. They remain in this position but out of contact with the bead for a predetermined time interval measured in seconds. The molds are again moved to open position and smartly pressed inwardly to press the softened glass bead and again retracted. The auto transformer is then adjusted for a predetermined greater flow of current through coil 38. After a certain time interval the molds are again heated by advancing them into the sleeve 50 after which the inner conductor switch 66 is opened, the molds retracted and the current through coil 38 decreased considerably. A second quick in and out movement of the molds is made to repress the glass. Then the molds are again moved inwardly, this time as means for withdrawing heat from the inner conductor 37. After a pre-determined time interval, again measured in seconds, the auto transformer is turned off and following a further interval the molds are again moved to inoperative position, the sealed mounting removed from the oven and the wire 37 trimmed to the desired length.

One use of the modification of the invention shown in Fig. 13 is illustrated in Fig. 14 in which latter view an end of the tubing 71 is brazed to a supporting part 85 arranged within the envelope of an electronic tube 86. This attachment of the tubing and its fusing with the glass of the envelope through which it extends necessitates subjecting the tubing 71 to heat subsequent to the coaxial sealing of the line wire 37ᵇ. And, it is to prevent a breaking of such sealing of the line wire, involving the glass bead 53 that, as hereinabove stated, calls for a predetermining of the strain pattern of the product of the invention.

In view of the above, it will be seen that I have provided an improved seal for a pair of concentric conductors with a glass bushing sealed within the outer tubular conductor and intermediate the ends thereof, the glass bushing having a desirable strain characteristic such that even though it is necessary to heat the outer conductor sufficiently to braze it to another conductor, the major portion of the glass will remain tightly sealed to both conductors and will be still in a slight state of compression, or at least will not be under a state of tension. Thus, by controlling the relative heating effects internally and externally, that is, through the line 37 or through the heating coil 38, I am able to control the strain pattern of the seal.

Although I have shown and described particular embodiments of my invention, I do not desire to be limited to the particular embodiments described, and I intend in the appended claims to cover all modifications which do not depart from the sphere and the scope of my invention.

What I claim is new and desire to secure by Letters Patent of the United States is:

1. The method of producing a vacuum-tight concentric seal having a metal tubing, a line wire extending through the tubing, and a glass bead sealed to the tubing and wire, including the steps of placing the wire under tension to hold it coaxial within the tubing, locating the bead at a pre-determined position within the tubing, applying heat externally of the tubing and through the wire to generate an internal heat to the bead, and pressing the glass when in a plastic state around the wire and against the inner surface of the tubing.

2. The method of producing a vacuum-tight concentric seal having a metal tube, a line wire extending through the tube, and a glass bead sealed to the tubing and wire, including the steps of placing the wire within the tubing and holding it relatively tightly and concentric of the tubing, positioning a bead of glass to a predetermined position within the tubing, applying heat externally of the tubing, and simultaneously passing an electric current through the wire to heat the glass bead from the inside, and pressing the glass bead from opposite sides when it is in a plastic state so that it will relatively tightly seal with the wire and the inner surface of the metal tubing.

3. The method of producing a vacuum-tight concentric seal having a metal tube, a line wire extending through the tube, and a glass bead sealed to the tubing and wire, including the steps of placing the wire within the tubing and holding it relatively tightly and concentric of the tubing, positioning a bead of glass to a predetermined position within the tubing, applying heat externally of the tubing, and simultaneously passing an electric current through the wire to heat the glass bead from the inside, and pressing the glass bead from opposite sides when it is in a plastic state so that it will relatively tightly seal with the wire and the inner surface of the metal tubing, and disconnecting the current from the line wire before removing the source of external heating so as to maintain the glass in a state of substantial compression when the concentric seal has cooled to ambient temperature.

4. In an apparatus for providing a seal through a glass bead between a metal tubing and a concentric wire including a fixed support for the tubing, means to clasp the wire at points beyond the ends of the tubing for holding the wire coaxially within the tubing and for applying tension to said wire, opposing press means movable toward and from each other along the wire to first position the bead at a predetermined point within the tubing and subsequently to press the softened glass to effect its fusion with the wall of the tubing and the wire, and means for heating the tubing to soften the glass.

5. In an apparatus for providing a seal through a glass bead between a metal tubing and a concentric line wire including a fixed support for the tubing, means to clasp the wire at points beyond the ends of the tubing for holding the wire coaxially within the tubing and means for applying tension to said line wire, opposing press means movable toward and from each other along the wire to first position the bead at a predetermined point within the tubing and subsequently to press the softened glass to effect its fusion with the wall of the tubing and the wire, external means for heating the tubing to soften the glass, and means for passing an electric current through the wire to heat the glass bead from the inside.

6. In an apparatus for providing a seal through a glass bead between a metal tubing and a concentric line wire including a fixed support for the tubing, means to clasp the wire at points beyond the ends of the tubing for holding the wire coaxially within the tubing and means for applying tension to said line wire, opposing press means movable toward and from each other along the wire to first position the bead at a predetermined point within the tubing and subsequently to press the softened glass to effect its fusion with the wall of the tubing and the wire, external means for heating the tubing to soften the glass, means for passing an electric current through the wire to heat the glass bead from the inside, and means for independently controlling the heating of the bead through the external means and through the wire.

7. In an apparatus for the concentric assembly and sealing of a metal tubing, a line wire extending through said tubing and a glass bead slidable on said wire, comprising an oven, a support for said oven, a resistance coil as the heating element within said oven and circuit connections to said coil, means supporting said tubing within said oven and surrounded by said coil, means to clamp said wire at points beyond the ends of said tubing for holding the wire coaxial with said tubing, opposing means movable toward and from each other along said wire to first position said bead at a predetermined point within said tubing and subsequently to press the softened glass to effect its fusing with the wall of said tubing and said wire, circuit connections leading through said wire clamping means to said wire, and means for independently varying and controlling the current in the two said circuit connections.

8. In an assembly fixture, the combination of a base, a pair of slides guided for reciprocating movement toward and from each other on said base, two opposing axially aligned press members mounted for axial adjustment upon said slides and each having a bore axially therethrough, means for supporting a tubing interposed between and in axial alignment with said press members, the opposing ends of said press members being formed to enter and slidably engage within the respective adjacent ends of said tubing on forward movement of said slides, means for supporting a wire threaded axially through said press members and coaxially through said tubing and carrying a glass bead slidable on said wire, said means for supporting said wire being located at points beyond the ends of said tubing, said supporting means including means for clamping said wire in electrical contact therewith, electrical connections to said supporting means whereby said wire serves as a heating means, additional heating means for independently heating said tubing, and manually operable means for effecting the simultaneous movement in opposing directions of said slides to first position said bead at a predetermined point within said tubing and then to press the softened glass.

9. An assembly fixture in accordance with claim 8 characterised in that said heating means for said tubing includes a resistance coil encircling the tubing, and in that the two said electrical heating means are connected in separate circuits and independently controlled.

10. An assembly fixture in accordance with claim 8 characterized in that said heating means for said tubing includes electrical resistance coil encircling the tubing, and an oven providing a housing for said coil and the support for said tubing, and in that means are provided for introducing a trickle of gas into said oven.

11. In an assembly fixture of the character described, a base, a pair of slides movable toward and from each other on said base, each of said slides including a block mounted thereon, a punch rod comprising a mold extending forwardly from said block and having an axial bore therethrough, and means for centralizing and clamping said mold to its supporting block, a manually operable lever pivoted intermediate its ends to said base at a point midway between said slides, connections between said lever and said slides whereby said slides are moved toward or from each other on a throw of said lever in one direction or the other, a resilient stop in the path of one of said slides and interposed between said slides, means for supporting a wire in coaxial arrangement with the axial bores in said molds.

12. An assembly fixture as recited in claim 11 characterized in that a pair of opposing links, pivotally connected to said lever at diametrically opposite points equidistant from its fulcrum and to said slides, constitute the connections whereby said slides are moved toward and from each other, at least one end of one link being detachable to permit its respective slide being independently moved, and means for releasably locking said lever at any desired position of angular throw.

PAUL HAAS.

REFERENCES CITED

The following references are of record in the file of this patent:

UNITED STATES PATENTS

| Number | Name | Date |
|---|---|---|
| 732,812 | Anderson | July 7, 1903 |
| 1,525,453 | Littleton | Feb. 10, 1925 |
| 1,868,177 | Rowe | July 19, 1932 |
| 1,912,405 | Ronci | June 6, 1933 |
| 1,974,305 | Doodale | Sept. 18, 1934 |
| 2,338,538 | Pulfrich, et al. | Jan. 4, 1944 |
| 2,384,833 | Goodale | Sept. 18, 1945 |
| 2,385,567 | Descarsin | Sept. 25, 1945 |
| 2,394,298 | Mouromtseff | Feb. 5, 1946 |
| 2,405,504 | Juvinall, et al. | Aug. 6, 1946 |

FOREIGN PATENTS

| Number | Country | Date |
|---|---|---|
| 549,277 | Great Britain | Nov. 13, 1942 |